United States Patent
Wistuba et al.

[11] Patent Number: 5,930,319
[45] Date of Patent: Jul. 27, 1999

[54] NUCLEAR REACTOR WITH A CORE MELT PROPAGATION SPACE PROVIDED WITH A COOLANT CONDUIT LEADING TO A COOLANT RESERVOIR

[75] Inventors: Lothar Wistuba, Herzogenaurach; Gerhard Hau, Albstadt; Dietmar Bittermann, Fürth; Horst Weisshäupl, Herzogenaurach, all of Germany

[73] Assignee: Siemens Aktiengesellschaft, Munich, Germany

[21] Appl. No.: 08/998,988

[22] Filed: Dec. 29, 1997

Related U.S. Application Data

[63] Continuation of application No. PCT/DE96/01083, Jun. 19, 1996.

[30] Foreign Application Priority Data

Jun. 27, 1995 [DE] Germany ............................ 195 23 303

[51] Int. Cl.⁶ .................................................. G21C 9/016
[52] U.S. Cl. .......................... 376/280; 376/282; 376/284
[58] Field of Search ................................... 376/280, 282, 376/284

[56] References Cited

U.S. PATENT DOCUMENTS 4,113,560  9/1978  Driscoll et al. ........................ 376/280
5,080,857  1/1992  Miller et al. ............................ 376/280

FOREIGN PATENT DOCUMENTS

| 0 419 159 A2 | 3/1991 | European Pat. Off. . |
| 32 45 451 A1 | 6/1983 | Germany . |
| 40 41 295 A1 | 7/1992 | Germany . |
| 43 37 367 A1 | 12/1994 | Germany . |
| 43 22 107 A1 | 1/1995 | Germany . |
| 1434384 | 5/1976 | United Kingdom .................... 376/280 |

OTHER PUBLICATIONS

"Towards an Enhanced Quality in Pressurized Water Reactor Safety" (Kuczera et al.), 7003 Kerntechnik, No. 4/5, Munich, Aug. 1994, pp. 151–155.

*Primary Examiner*—Daniel D. Wasil
*Attorney, Agent, or Firm*—Herbert L. Lerner; Laurence A. Greenberg

[57] ABSTRACT

A nuclear reactor includes a propagation space for core melt. The propagation space has a coolant conduit leading to a coolant reservoir and a device which opens in a temperature-dependent manner. The coolant conduit in the propagation space is a spray conduit having a spraying area which covers the cross-section of the propagation space over a large area. The device is controlled in such a way that it opens when the core melt enters the propagation space. Spraying gives rise to a crust on the core melt which reduces heat radiation. At the same time, the propagation space fills with a steam atmosphere which drastically reduces the thermal load on building structures.

5 Claims, 6 Drawing Sheets

NUCLEAR REACTOR WITH A CORE MELT PROPAGATION SPACE PROVIDED WITH A COOLANT CONDUIT LEADING TO A COOLANT RESERVOIR

CROSS-REFERENCE TO RELATED APPLICATION

This application is a continuation of International Application Ser. No. PCT/DE96/01083, filed Jun. 19, 1996, which designated the United States.

BACKGROUND OF THE INVENTION

1. Field of the Invention

The invention relates to a nuclear reactor with a propagation space for core melt, the propagation space being provided with a coolant conduit which leads to a coolant reservoir and which has a valve opening in a temperature-dependent manner.

In a nuclear reactor of the above-mentioned type, which is known from German Published, Non-Prosecuted Patent Application DE 40 41 295 A1, a steel crucible disposed in a reactor pit receiving a reactor pressure vessel has a plurality of inner protective layers, in order to withstand the high temperature of the core melt. A coolant pipe leads in an upper half through a wall of the crucible and a melting plug is located at an end of the coolant pipe which is inside the crucible. Another end of the coolant pipe leads to a coolant reservoir. If core melt escapes from the reactor pressure vessel, it is intercepted directly below the reactor pressure vessel within the reactor pit. If the core melt rises level with an outlet orifice of the cooling conduit, the melting plug is melted open as a result of direct contact or as a consequence of heat radiation. Cooling water is thereby guided in a large quantity onto the surface of the core melt for the direct cooling of the latter. Indirect cooling of the core melt takes place through a cooling system disposed outside the crucible. Direct cooling does not commence until clearly after indirect cooling and leads to a rapid flooding of the crucible, in which case large quantities of cooling water can come into contact with the core melt.

SUMMARY OF THE INVENTION

It is accordingly an object of the invention to provide a nuclear reactor with a core melt propagation space provided with a coolant conduit leading to a coolant reservoir, which overcomes the hereinafore-mentioned disadvantages of the heretofore-known devices of this general type and which allows early direct cooling of a core melt, flowing into a propagation space, over a region of large area.

With the foregoing and other objects in view there is provided, in accordance with the invention, a nuclear reactor, comprising a coolant reservoir; a propagation space for core melt, the propagation space having a given cross-section; a spray conduit disposed in the propagation space, fed by the coolant reservoir and having a spraying area covering a large area of the given cross-section; and a device associated with the spray conduit and controlled for temperature-dependent opening when the core melt enters the propagation space. The cross-section of the propagation space can be spheroidal or polygonal (rectangular, hexagonal).

The rapid, large-area spraying which takes effect from the outset gives rise to a crust on the core melt that appreciably reduces heat radiation. At the same time, an intercepting space above the crust fills with a steam atmosphere which drastically lowers the thermal load on the building structures, so that special protective layers (for example on the ceiling) can be avoided.

As a result of the spraying of the core-melt surface, the water is distributed uniformly on the latter, thereby preventing water from infiltrating into the core melt and causing steam explosions. The crust, which becomes constantly thicker as a result of the spraying, acts in the same way, because it limits interactions between the core melt and water, that is to say, above all, it prevents steam explosions.

In accordance with another feature of the invention, the spray conduit is disposed on the walls of the propagation or intercepting space, in such a way that it encloses the cross-section of the propagation or intercepting space. It can be fastened there in a simple way and, without further action, produces a large-area spray mist.

In accordance with a further feature of the invention, the spray conduit is alternatively or additionally run at a distance from the bottom, over the cross-section of the propagation space. Such a configuration is provided, for example, in sprinkler systems in agriculture with pipelines running parallel to one another in order to cover a large area. For this purpose, it is possible to provide a multiplicity of spray conduits, which run parallel to one another or which intersect.

In accordance with an added feature of the invention, in order to increase operating reliability, the spray conduit is a ring conduit having a plurality of feeds.

It is advantageous for spraying to commence rapidly. In accordance with an additional feature of the invention, the device is a passively opening fitting which causes an opening of the coolant conduit, particularly in a temperature-dependent manner.

In accordance with a concomitant feature of the invention, the device opening in a temperature-dependent manner is consequently disposed below the spray conduit, in such a way that a melting body keeping a sealing disc closed counter to the pressure of the coolant is located at the bottom of the propagation space.

Other features which are considered as characteristic for the invention are set forth in the appended claims.

Although the invention is illustrated and described herein as embodied in a nuclear reactor with a core melt propagation space provided with a coolant conduit leading to a coolant reservoir, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
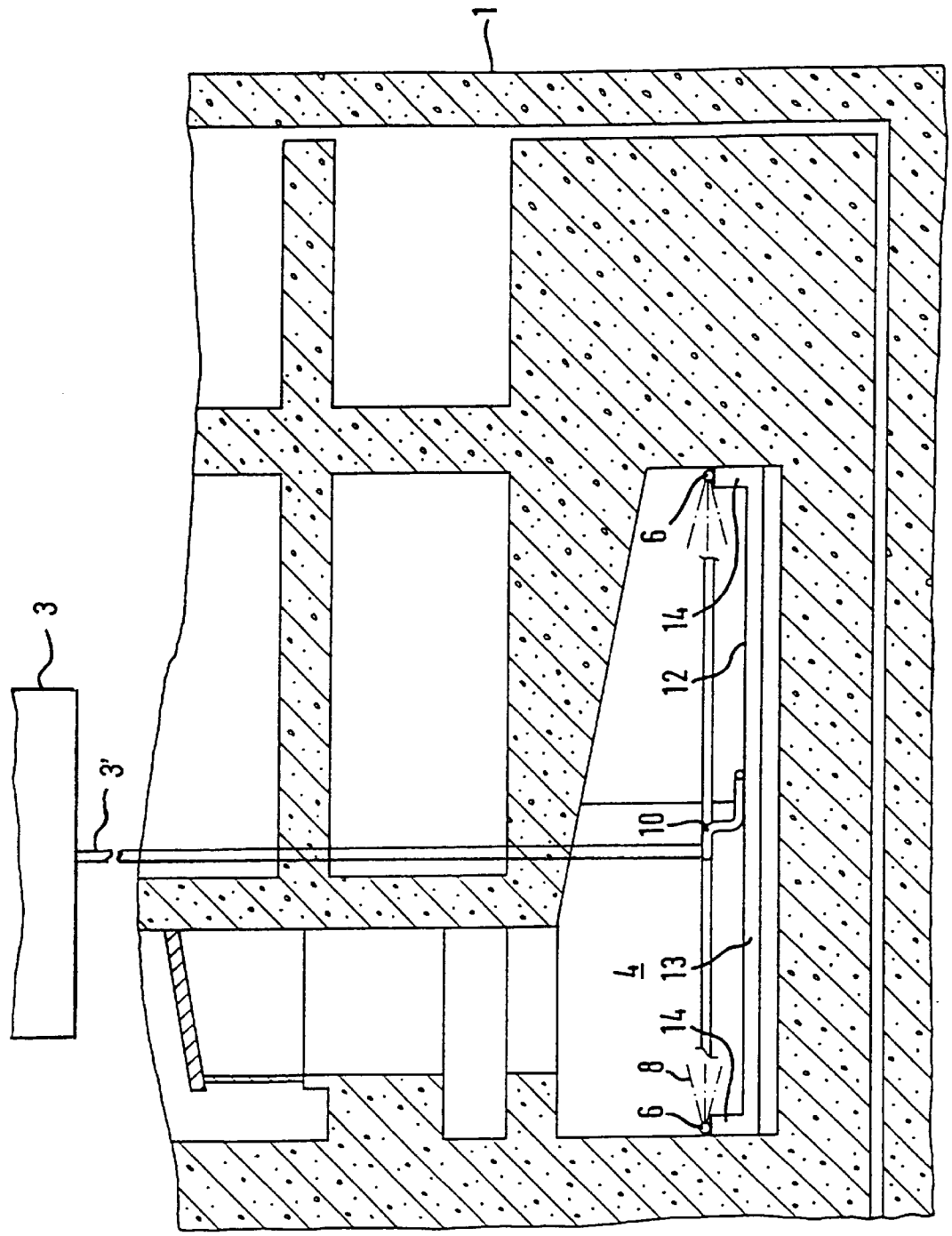
FIG. 1 is a fragmentary, diagrammatic, vertical-sectional view of a nuclear reactor.
Figure 2:
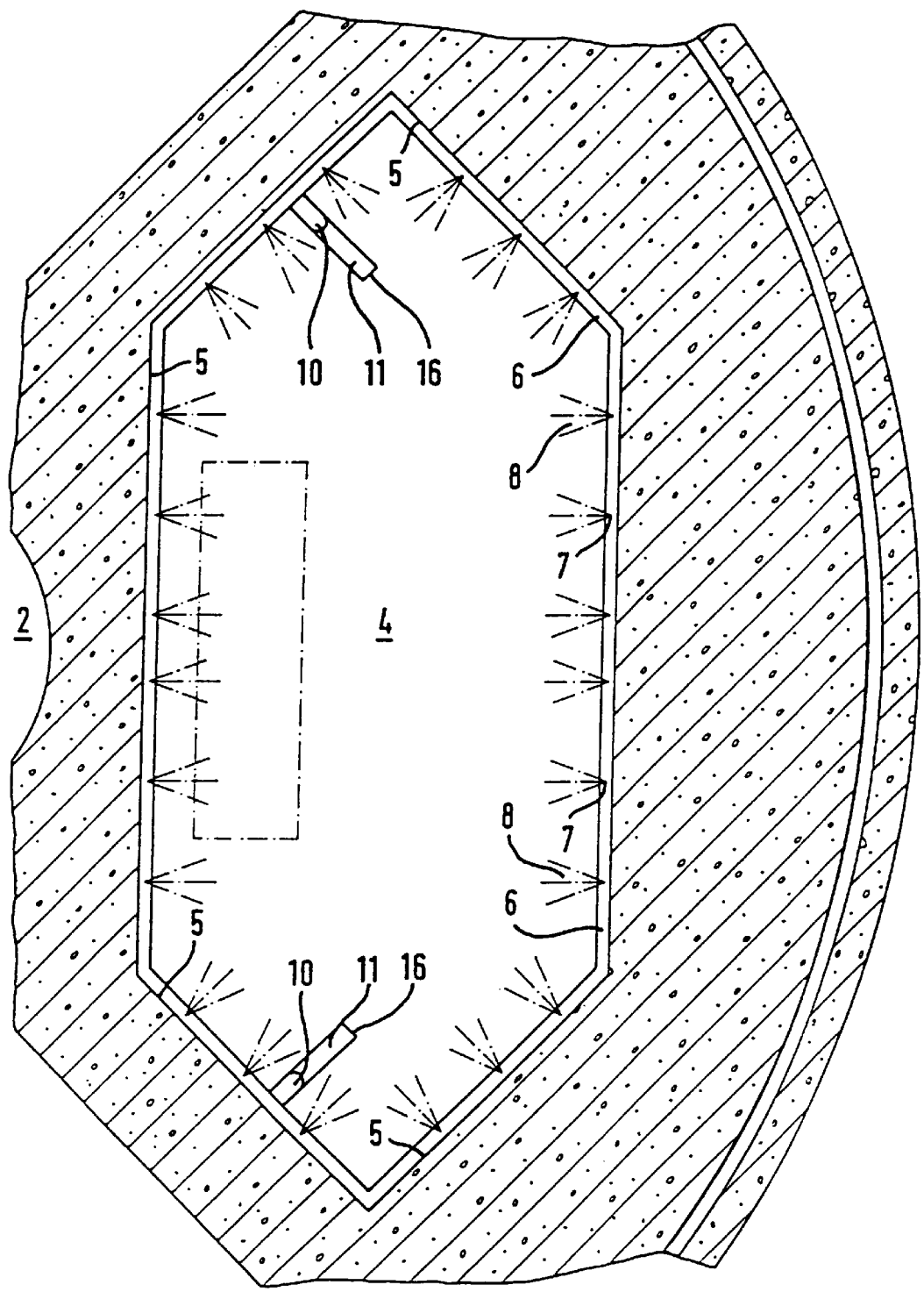
FIG. 2 is a fragmentary, horizontal-sectional view of a nuclear reactor.

Referring now to the figures of the drawings in detail and first, particularly, to FIG. 1 thereof, there is seen a reactor building 1 formed of concrete and containing a non-illustrated reactor pressure vessel having a reactor core in a central reactor pit 2 seen in FIG. 2. A non-illustrated collecting conduit extending at an inclination to the horizontal leads from the reactor pit 2 into a propagation space 4 in a lower part of the reactor building 1.

As is shown in FIG. 2, the propagation space 4 has an elongate hexagonal cross-section with plane vertical walls 5. A ring conduit 6, which is constructed as a spray conduit with spray nozzles 7, extends around the entire cross-section. The spray nozzles 7, which in the simplest instance are produced as cylindrical holes in the ring conduit 6, are directed horizontally into the interior of the propagation space 4, so that its cross-section can be sprayed over a large area. A spray mist is indicated by jets 8.

In order to feed the ring conduit 6, a reservoir 3 is disposed so high in an upper part of the reactor building 1 that a pressure of, for example, 1 bar, that is suitable for reliable supply, prevails at the ring conduit 6. The feed takes place through the use of coolant pipes 3' and two feed conduits 10 which are mounted on virtually opposite sides of the ring conduit 6. The feed conduits 10 are angled pipe connections with a lower leg 11 seated on a bottom 12 of an intercepting trough 13. The ring conduit 6 rests on an upper edge 14 of the intercepting trough 13.

Figure 3:
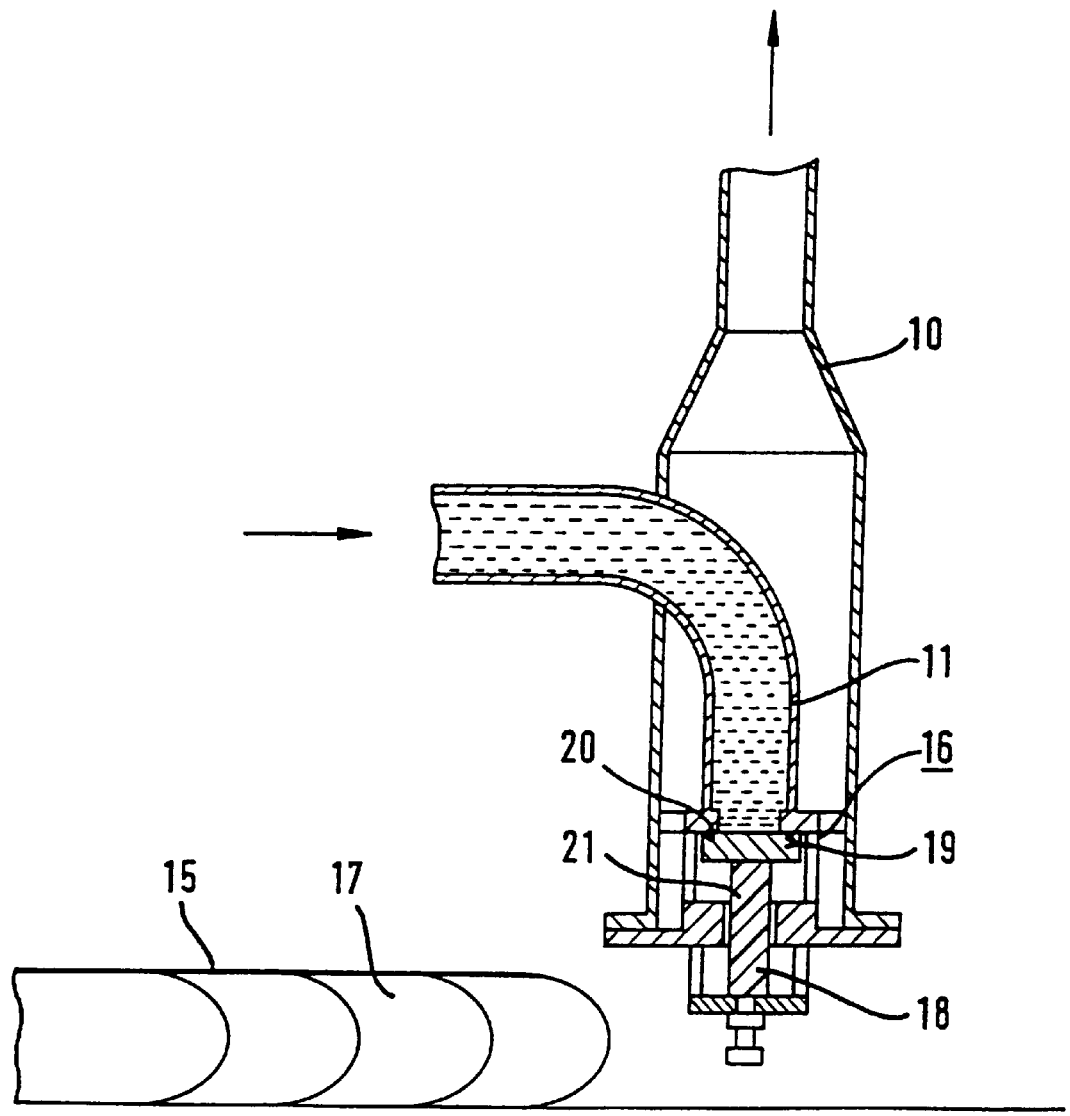
FIGS. 3 to 6 are enlarged, fragmentary, vertical-sectional views of a device for use in the invention.

The low position of the leg 11 ensures that a temperature-sensitive device 16 puts a feed of coolant into operation as soon as a diagrammatically indicated core melt 17 spreads out on the bottom 12, as is seen in FIG. 3. It then immediately destroys a melting body 18 made of plastic or of a low-melting metal, through the use of which a sealing disc 19 of the device 16 is pressed onto a sealing seat 20 counter to the pressure of the coolant. The coolant then passes through the feed conduits 10 into the ring conduit 6 and from there it becomes the jets or spray mist 8 which ensures the desired rapid cooling and formation of a crust 15 on the core melt 17. At the same time, due to the fine distribution of the water, a steam atmosphere shielding the structures of the reactor building 1 is generated without steam explosions.

The coolant flows over a large area through a housing of the device 16 and thereby ensures that it remains intact, even when the melt 17 rises higher. It is also possible, however, to lengthen a shank 21 leading to the sealing disc 20, in such a way that the device 16 is located above the highest expected level of the melt 17, without impairing the rapid opening of the device 16 through the use of the melting body 18 located on the bottom 12.

Figure 4:
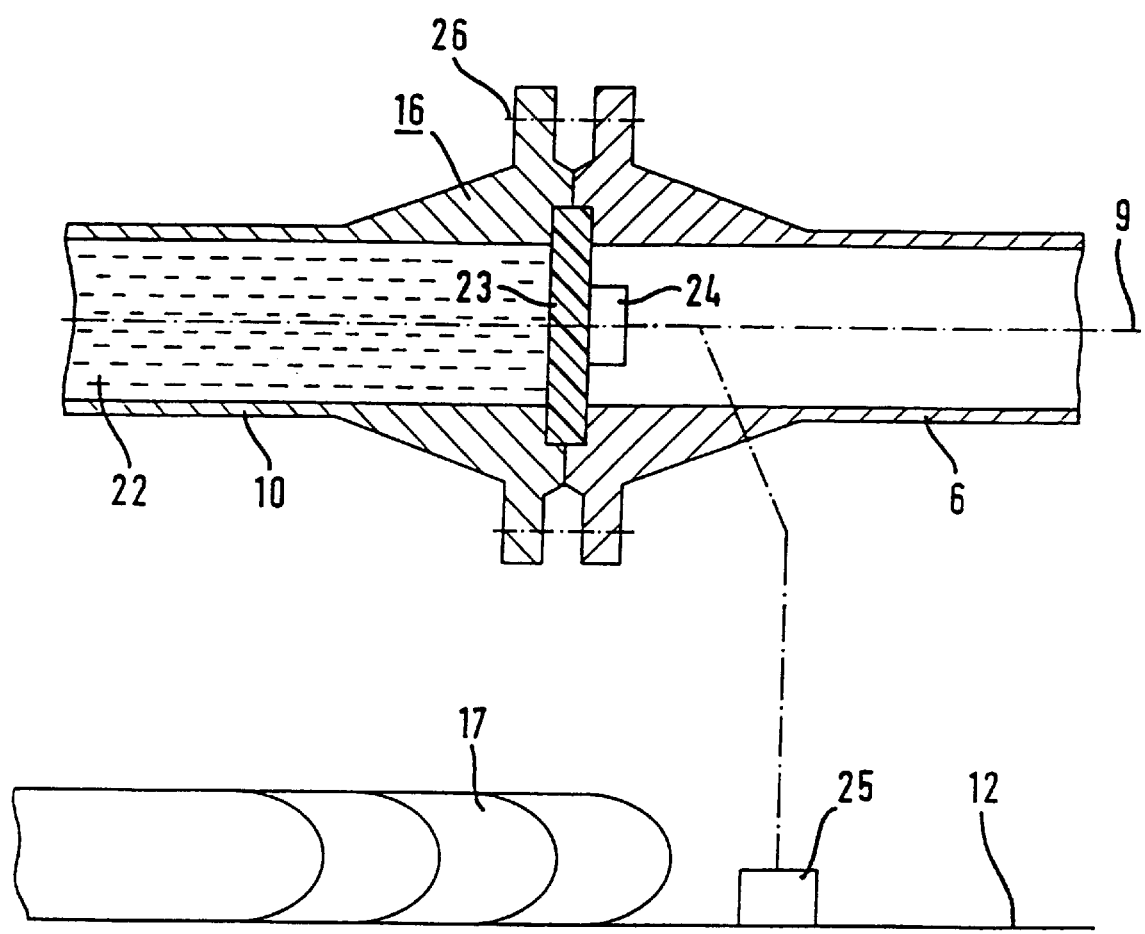

FIG. 4 shows a longitudinal section through an embodiment of the device 16, which is disposed so far above the bottom 12 of the propagation space 4 that the diagrammatically represented core melt remains clearly below the device 16. The device 16 is located on a flanged connection 26, at which the feed conduit 10, that extends along a main axis 9, is connected to the ring conduit 6. In the device 16, the cross-section of the feed conduit 10 is blocked at the flanged connection 26 through the use of a bursting disc 23. A coolant 22 bears on the bursting disc 23 within the feed conduit 10, for example with a pressure of about 1 bar. A piezoelectric element 24 which is mounted fixedly in the ring conduit 6 on the bursting disc 23, is connected to a thermocouple 25 lying on the bottom 12 of the propagation space 4. When the core melt 17 spreads out within the propagation space 4, a signal is generated within the thermocouple 25 by the core melt through direct contact or as a result of heat radiation and is transmitted to the piezoelectric element 24. As a consequence of the signal applied to the piezoelectric element 24, the latter undergoes expansion which leads to destruction of the bursting disc 23 and consequently to an inflow of the coolant 22 into the ring conduit 6. The initiation of the spraying operation and consequently the cooling of the core melt by spraying are thereby put into operation.

Figure 5:
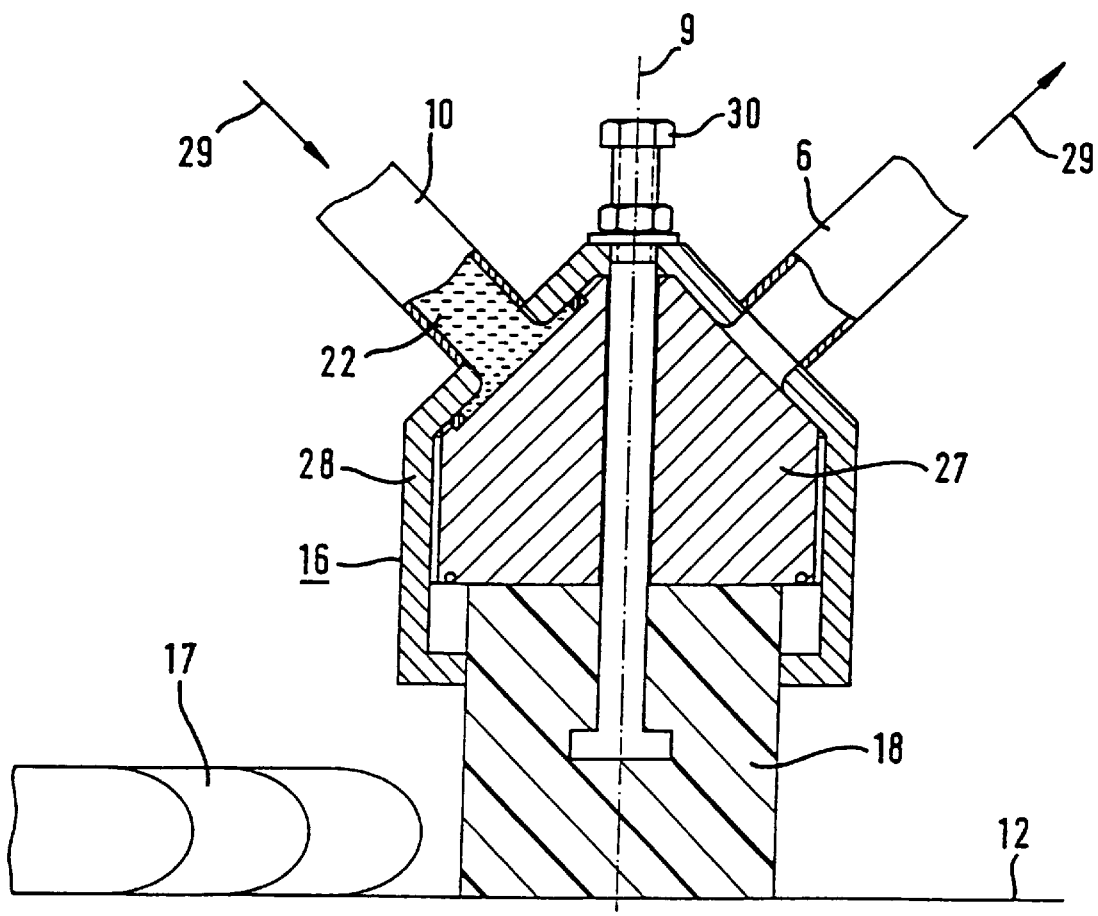

FIG. 5 shows a longitudinal section through an embodiment of the device 16 which is similar to the device of FIG. 3. The device 16 extends symmetrically along a main axis 9. In a genetically upper region, a wall 28 of the device 16 extends at an inclination to the main axis 9, so that this region has the form of a cone extending towards the main axis 9. The feed conduit 10 opens into one side of this conical wall and the ring conduit 6 leads away from another side of the wall 28. Disposed inside the device 16 is a likewise conical sealing body 27 which extends along the main axis 9 and blocks both the feed conduit 10 and the ring conduit 6 in a sealing position. The sealing body 27 is held in this sealing position by the melting body 18 which projects out of the device 16 along the main axis 9 and rests on the bottom 12 of the propagation space 4. The melting body 18 is fixed in its position by a screw 30 which likewise extends along the main axis 9.

The melting body 18 is formed of plastic and the sealing body 27 is formed of a metal, such as steel, or a ceramic or plastic. When the diagrammatically represented core melt 17 comes in contact with the melting body 18, the latter melts open, with the result that the pressure acting on the sealing body 27 displaces it along the main axis, out of its sealing position, due to the coolant bearing on it in the feed conduit 10. This allows the coolant 22 to flow through the device 16 into the ring conduit 6, as is represented by flow arrows 29.

Figure 6:
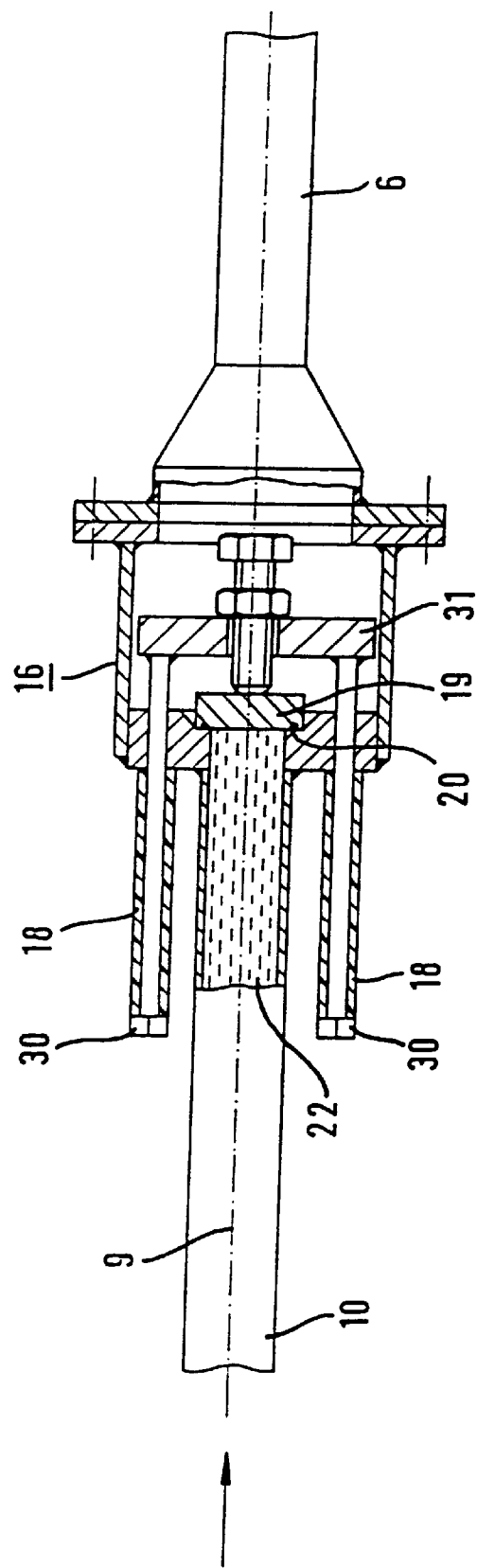

FIG. 6 shows a section through a device 16 which extends along a main axis 9. The feed conduit 10 likewise extends along the main axis 9 and leads into the device 16 and the ring conduit 6 likewise extends along the main axis 9 and leads out of the device 16. The device 16 has a sealing disc 19 which rests on a sealing seat 20 and thereby closes the cross-section of the feed conduit 10. The sealing disc 19 is held in a position closing the feed conduit 10 by a plate 31 extending perpendicularly to the main axis 9. This is accomplished by two screws 30 extending along the main axis 9 and being surrounded in each case by a melting sleeve 18 which prevents the screws 30 and therefore the plate 31 from moving along the main axis 9. When a core melt 17 enters the propagation space 4, the melting sleeves 18 melt down, so that the sealing disc 19 is displaced along the main axis 9 as a result of the pressure exerted on it by the coolant 22. The coolant 22 thereby passes into the device 16 and flows through the ring conduit 6 to the non-illustrated spray nozzles. The devices 16 of FIGS. 3–6 may be referred to as fittings or valves.

The invention is distinguished by a passively released spray system in a propagation space for a core melt. Through the use of the spray system, early cooling of the spreading core melt over a large area is carried out with a small quantity of cooling water, so that the risk of steam explosions is clearly reduced. The spraying of the core melt preferably takes place through a ring conduit which extends along the circumference of the propagation space and is connected to a coolant reservoir that is disposed geodetically so high above the ring conduit that a pressure necessary for large-area spraying is generated. Coolant is constantly present in corresponding feed conduits and is held back from the ring conduit by a device. The device opens passively in a temperature-dependent manner, as a result of which direct cooling of the core melt takes place in a reliable way without operating personnel being involved, when the core melt enters the propagation space. Furthermore, there are provided at least two flooding conduits which are connected to a large coolant reservoir and through which coolant can be supplied for long-term cooling of the core melt.

We claim:

1. A nuclear reactor, comprising:

a coolant reservoir;

a propagation space for core melt, said propagation space having a given cross-section;

a spray conduit disposed in said propagation space, fed by said coolant reservoir and having a spraying area covering a substantial area of said given cross-section for forming a crust on the core melt; and a fitting associated with said spray conduit, said fitting having a melting body and opening passively in a temperature-dependent manner when the core melt enters said propagation space.

2. The nuclear reactor according to claim 1, wherein said propagation space has walls, and said spray conduit is disposed on said walls and encloses said given cross-section of said propagation space.

3. The nuclear reactor according to claim 1, wherein said propagation space has a bottom, and said spray conduit extends at a distance from said bottom over said given cross-section of said propagation space.

4. The nuclear reactor according to claim 1, wherein said spray conduit is a ring conduit having a plurality of feed conduits.

5. The nuclear reactor according to claim 1, wherein said propagation space has a bottom, said fitting is disposed below said spray conduit and has a sealing disc, and said melting body is located at said bottom of said propagation space and keeps said sealing disc closed counter to coolant pressure.

* * * * *